United States Patent [19]

Peng et al.

[11] Patent Number: 4,906,705

[45] Date of Patent: Mar. 6, 1990

[54] METHOD OF LITHIATING A TERTIARY CHLORO ALKYL COMPOUND AND THE PRODUCT PROVIDED BY SAID METHOD

[75] Inventors: Kuo L. Peng, Edison, N.J.; Joseph P. Kennedy, Akron, Ohio

[73] Assignee: The University of Akron, Akron, Ohio

[21] Appl. No.: 177,433

[22] Filed: Apr. 4, 1988

[51] Int. Cl.$^4$ .................................................. C08F 8/42
[52] U.S. Cl. .................................. 525/333.7; 525/355; 525/359.1; 525/395.5; 525/366
[58] Field of Search ............... 525/333.7, 359.1, 359.5, 525/366

[56] References Cited

U.S. PATENT DOCUMENTS

| | | | |
|---|---|---|---|
| Re. 31,770 | 12/1984 | Milkovich | 525/314 |
| 3,862,100 | 1/1975 | Halasa et al. | 525/332.9 |
| 4,078,019 | 3/1978 | Langer, Jr. | 525/316 |
| 4,107,238 | 8/1978 | Roper et al. | 525/316 |
| 4,108,921 | 8/1978 | Langer, Jr. | 525/314 |
| 4,134,938 | 1/1979 | Langer, Jr. | 525/314 |
| 4,417,029 | 11/1983 | Milkovich | 525/314 |
| 4,471,099 | 9/1984 | Trepka | 525/338 |

*Primary Examiner*—Joseph L. Schofer
*Assistant Examiner*—Bernard Lipman
*Attorney, Agent, or Firm*—Oldham & Oldham Co.

[57] ABSTRACT

A method of treating a hydrocarbon containing a tertiary chloroalkyl groups to convert it to an allylic lithium by dehydrochlorinating the above either simultaneously or sequentially, to first dehydrochlorinate the compound to form a terminal unsaturation and then converting it to an allylic lithium derivative. Alkyl lithium is used to generate the allylic lithium derivative alone or with a complexing agent. The complexing agents are ethers, such as tetrahydrofuran, diamines with diethyldiamino ethane being a preferred one, and t-buOK. The solvents used are tetrahydrofuran, the cycloalkanes such a cyclohexane and the alkanes such as hexanes, pentanes and heptanes.

7 Claims, No Drawings

METHOD OF LITHIATING A TERTIARY CHLORO ALKYL COMPOUND AND THE PRODUCT PROVIDED BY SAID METHOD

TECHNICAL FIELD

This invention relates to a method which, in its preferred form, consists essentially of the use of a single pot reactor for converting tertiary chloroalkyl compounds to lithium-containing compounds containing one, two, three or more lithium atoms. More particularly, this invention relates to lithium-containing compounds having an allyl lithium attached to a polyolefin segment. More specifically, this invention relates to a lithiated compound having at least one allyl lithium attached to the polyolefin segment, said segment being obtained from the tertiary chloro alkyl compound containing the polyolefin segment.

BACKGROUND OF THE INVENTION

Lithium compounds of fairly simple structure are well known and available commercially. Usually these are simple alkyl lithiums or aryl lithiums. These lithium compounds are used as catalysts or to prepare special catalysts or special compounds containing alcoholic, phenolic, epoxy or acid groups.

DISCLOSURE OF THE INVENTION

We have discovered that polyolefin capped by a tertiary chlorine group can be simultaneously dehydrochlorinated and lithiated in the presence of lithium alkyl compound to give a polyolefin capped by at least one allyl lithium. Also, the reaction can be carried out by first dehydrochlorinating to produce the olefin derivative and then treating with an alkyl lithium compound to produce the allylic lithium derivative therefrom.

We have discovered that simple tertiary chloro alkyl compounds with molecular weights greater than about 500, can be lithiated in a single reactor by simultaneously dehydrochlorinating and lithiating to produce a compound having at least one allyl lithium group thereon. Hence this method embodiment permits the elimination of operating steps as well as the need for a second reactor, and yet produces new compounds consisting of a polyolefin carrying allylic lithium at its extremities. The polyolefin segments have a wide range of molecular weights, i.e. from about 500 to 1000, 20,000 or even 50,000 or more. For example, it is now possible to easily and conveniently prepare or synsthesize isopropylidene or related tertiary carbon-capped linear and three-arm star polyolefins, for instance polyisobutylenes. These are the starting materials used in our method. The inifer synthesis technique as described by R. Faust and Joseph P. Kennedy in *J. Polymer Science*, Part A, Polymer Chemistry 25, 1847 (1987) and by G. Kaszas, J. Puskas and Joseph P. Kennedy, *Polymer Bulletin*, 18, 123 (1987) or the living polymerization synthesis technique, as described in Josesph P. Kennedy's copending patent applications, Ser. No. 746,835, filed June 20, 1985, now abandoned and Ser. No. 899,655, filed Aug. 25, 1986, now abandoned, offer other methods of preparing starting materials used in this invention. The chlorine containing compounds of relatively low molecular weight or those of very high molecular weight, such as about 1,000 to 50,000 or more, are excellent starting materials for the preparation of the new compositions of this invention.

Materials Preparation

In the practice of this invention it is desirable to prepare or treat the materials to be used to eliminate certain impurities to facilitate the obtaining of higher purity or better yield.

The hexanes were refluxed with fuming sulfuric acid, washed till neutral with plenty of water, dried over anhydrous $CaCl_2$ and distilled over $CaH_2$, then distilled over sodium with benzophenone before use. 2,2,4-Trimethyl-1-pentene (TM1P) and 2,4,4-trimethyl-2-pentene (TM2P) (Aldrich Chemical Co.) were distilled over sodium benzophenone before use. n-, s- and t-Butyl lithium (Aldrich Chem. Co.) were used as received. Their concentrations were determined by tiltration by the method reported in *Journal of American Chemical Society*, 66 15 15 (1944) before use. Tetramethylethylenediamine (TMEDA) (Aldrich Chem. Co.) was refluxed over sodium and distilled under nitrogen before use. Potassium-t-butoxide (t-buOK) (Aldrich Chem. Co.) was used as received. $Me_3SiCl$ (Aldrich Chem. Co.) was distilled under nitrogen. 12-crown-4 (Aldrich Chem. Co.) was dried over 4A° molecular sieves. 1,2-Dipiperidinoethane (1,2-DPE) (Aldrich Chem. Co.) was dried over Na/K alloy, then distilled under high vacuum. 1,2-Dimethoxyethane (Fluka Co.) was dried over $CaH_2$, then distilled. Isobutylene (Linde Division, Union Carbide Corp.) was dried by passing the gas through glass columns packed with molecular sieves (3A° powder). Methyl chloride (Linde Division, Union Carbide Corp.) was dried by passing the gas through glass columns packed with porous barium oxide and molecular sieves (3A°, powder). 1,4-Di(2-hydroxy-2-propyl)-benzene (Goodyear Tire and Rubber Co.) was recrystallized from methanol before use. 1,3,5-Triisopropenylbenzene, N-bromosuccinimide, acetyl chloride (all from Aldrich Chem. Co.) were used without further purification. t-Butylbenzene (Aldrich Chem. Co.) was washed several times with sulfuric acid at 0° C. followed by washing with water and distillation. Methylene chloride was distilled over $CaH_2$ before use.

Analytical Procedures $^1H$ NMR spectra were obtained with a Varian T-60 or a XL-400 spectrometer. Analytical gas chromatography was carried out by using a Hewlett-Packard Model 5750 instrument and a 12 foot column packed with SE-30, a commercial packing. Mass spectroscopy was obtained by a Hewlett-Packard 5995 Gas Chromatograph-Mass Spectrometer. Gel permeation chromatography (GPC), proton nuclear magnetic resonance ($^1H$ NMR) and gas chromatography (GC) analyses have been described in Faust and Kennedy above.

In our work we learned that certain model compounds with end structures like that of the polyolefin containing the tertiary chloro alkyl group, mimic each other so these model compounds were used to determine the operating parameters of our invention methods. The nature of the operating parameters of our invention method can be seen and understood better from the following representative and illustrative examples where all parts and percentages are by moles unless otherwise stated.

EXAMPLE I

Lithiation-Silylation of TM1P by Butyl lithium/Base Complexes

The glassware was dried at ~140° C. for 24 hours. TM1P was then transferred by a syringe to a flask containing a magnetic stirrer and dried by several vacuum-nitrogen-flush cycles. The liquid base was introduced by a syringe (the solid base, tBuOK, was introduced before TM1P was added under $N_2$ in a glove bag) and under stirring the butyl lithium was added slowly (5–10 min.) at the desired temperture. Within a short time the color of the mixture became dark brown. Usually after about three hours the lithiation is complete; then the lithiation was proved as follows: The flask was cooled to 0° C. and quenched with $Me_3SiCl$ dissolved in THF (1:1 v/v). The solution became creamy white. The solution was stirred at 0° C. for three more hours then~ ml 10 percent aqueous $Na_2Co_3$ was added. After 5 min., the mixture was washed in sequence with 10 percent aqueous $Na_2CO_3$, dilute HCl, 10 percent aqueous $Na_2CO_3$, water, then dried over anhydrous $MgSO_4$. The extent of reaction was followed by $^1H$ NMR and gas chromotography. Finally, the solution was concentrated by distilling under nitrogen below 70° C. Pure 2(trimethylsilyl)4,4-dimethyl-1-pentene (TM1P-Si) was obtained by vacuum distillation. The $^1H$ NMR spectrum of the distillate and the mass spectroscopy value of m/e=184.30 and the bp. of 174° C. of the distillate proved it was 2(trimethylsilyl)4,4-dimethyl-1-pentene. Thus, the lithiation was essentially quantitative.

EXAMPLE II

Lithiation of p-di-t-butylbenzene by s-BuLi/TMEDA

The technique was similar to that used with TM1P. Thus 0.31 g p-di-t-butylbenzene was placed in a flask under nitrogen containing a magnetic stirring bar, 33 ml olefin-free hexanes were added followed by the addition of 0.74 ml TMEDA. After cooling to 0° C., 9 mL s-BuLi (1.4M solution in cyclohexane) were introduced and the solution was stirred at room temperature for 11 hours. The mixture was slowly added to 50 ml THF saturated with $CO_2$. The yellow color disappeared and became creamy white. Ether and dilute HCl were added, followed by two washings with dilute HCl and water. The ether layer was dried over anhydrous $Na_2SO_4$ and concentrated to ~20 ml. The product was obtained after storing the solution in the freezer. This product was a carbonic acid derivative formed by carbon dioxide treatment of the lithium adduct.

EXAMPLE III

Lithiation-Silylation of Isopropylidene-Capped PIB by the s-BuLi/TMEDA system The experimental conditions for polymers were similar to those used in the above model experiments. A typical procedure was as follows: To 4.0 g $\alpha,\omega,\delta$-triisopropylidenepolyisobutylene ($M_n$=3,520), 2.0 ml TMEDA were added under stirring, then 12.1 ml (1.4M of s-BuLi in hexanes) was introduced at room temperature. Gradually, the reacton mixture became dark brown. After 6 hours, the system was cooled to 0° C. and quenched with three times the excess amount of $Me_3SiCl$ in THF (2:1 v/v). The mixture was stirred overnight and then ~10 ml 10 percent aqueous $Na_2CO_3$ were added. After washing in sequence with 10 percent aqueous $Na_2CO_3$, dilute HCl, 10 percent aqueous $Na_2CO_3$ and water, the solution was dried over anhydrous $Na_2SO_4$. After filtration, the solution was concentrated, then twice reprecipitated from acetone to obtain $\alpha,\omega,\delta$-tri(trimethylsilylisopropylidene)-polyisobutylene having $M_n$ value of about 3,500. Thus each double bond in the isopropylidene capped polyisobutylene had been quantitatively lithiated.

EXAMPLE IV

Dehydrochlorination of $(CH_3)_3CH_2C(CH_3)_2Cl$, (TMP-Cl)

Various aliquots of TMP-Cl were treated with the following alternative ingredients. TMP-Cl (0.030 mL, 0.18 mmol), hexanes (2.0 mL), n-undecane (0.025 mL, internal standard for GC analysis), and if needed the complexing agent, i.e. TMEDA (0.044 mL, 0.29 mmol) or THF (0.133 mL, 1.64 mmol), were placed under nitrogen in a 5 mL reactor equipped with a Rotaflo ® stopcock. Then 0.28 mmol BuLi (0.20 mL 1.4 mol/L n-BuLi in hexanes, or 0.28 mL 1.0 mol/L s-BuLi in cyclohexane, or 0.19 mL 1.5 mol/L t-BuLi in pentane) was introduced with a syringe under nitrogen at room temperature. Samples (ca. 0.5 mL) were removed from each treated aliquot after 2, 5, and 15 hours under nitrogen, deactivated with 0.5 mL $H_2O$, dried over $MgSO_4$ and subjected to GC and $^1H$ NMR analyses to follow the lithiation of the TMP-Cl. These results showed the lithiation gave at least about 70 and 90 percent yield under these conditions. Higher yield was obtained with N and S butyl lithium mixture.

EXAMPLE V

Dehydrochlorination-lithiation of t-chlorine-capped polyisobutylene by n-BuLi/s-Buli/TMEDA followed by silylation A typical experimental procedure was as follows: n-BuLi (1.9 mL, 1.57 uM in hexanes) for dehydrochlorination was introduced into a flask containing premixed $\alpha,\omega,\delta$-di-(2-chloro-isopropyl)polyisobutylene (1.9 g, $M_n$ 2,500) and TMEDA (2.06 mL). The extent of dehydrochlorination was determined by obtaining small samples from the reaction mixture and analyzing by $^1H$ NMR spectroscopy, i.e., comparing the peak areas under the resonances corresponding to the vinyl and phenyl protons. After 2-3 hours at room temperature, s-BuLi (10.9 mL, 1.37M in cyclohexane) was added. The color of the mixture changed from light yellow to brown. Lithiation time was usually 5-6 hours. The silylation of the lithiated polyisobutylenes by treatment with $Me_3SiCl$ showed essentially a quantitative yield of the silylation product. Thus indicating the chlorine had been removed by dehydrochloronation and the double bond generated was lithiated essentially quantitatively to yield the allylic lithium derivative.

In the above experiments as shown therein, the extent of the quantitation of the lithiation was determined by quenching the reaction with $Me_3SiCl$. Then the silylated product was recovered by vacuum distillation. Thus, it was found that under the above conditions (i.e. by the use of t-TM1P/s-BuLi/TMEDA at a ratio of 0.5/1.0/05), only TM1P-Si was formed. A comparison of the spectra of TM1P ( ppm), 1.0 (t-Bu), 1.8[$C(CA_3)=C$, 1.9($CH_2$) and 4.85, 4.62(—$C=CH_2$)], and TM1P-Si indicates quantitative lithiation/silylation. Also, the mass spectrum of TM1P-Si indicates close to theoretical value, i.e. m/e=184.30 which was very close to the theoretical value of m/e=184.0.

We discovered that combintions of butyl lithium and TMEDA and n-butyl lithium/t-buOK gave much preferred yields in reaction times of 3 hours and up to 40 hours. The yield in this one pot reaction was 60 to 70 percent at temperatures of −75° C. to +50° C. Temperatures above 0° C. with n-butyl lithium alone is desired with about 25° C. to about 35° C. to about 50° C. being the more desirable.

Higher TMEDA/TM1P ratios tended to suppress the formation of dilithium adducts of TM1P with the yield of monolithium adduct reaching a maximum at a TMEDA/TM1P of about 1.

Therefore, the preferred TMEDA/TM1P ratio is about 2 to 1–2. It should be appreciated that, at the higher temperatures, the dilithium adduct increases. Thus, a suitable temperature is about −25° C. to about 25° C. with s-alkyl lithiums while n-alkyl lithiums perform best at about 10° C. to 40° C.

Generally, TMEDA/s-BuLi/TM1P ratios of 1:2/2:1 give quantitative TM1P lithiation. These ratios have been found to be similarly desirable for lithiation of alkyl chlorotertiary group on a polyolefin segment. Thus, the lithiation proceeds smoothly as the molecular weight of the alkyl chlorotertiary group on the polyolefin varies from as low as 500 to 1000 to 10,000 and even higher to 20,000 to 50,000 or more. Thus, we have found that lithiation may proceed by the more torturous route of two separate reactions or two essentially simultaneous ones. Specifically, the chlorine atom on the tertiary alkyl compound is removed by dehydrochlorination, to convert it to a terminal olefin, which then is treated with an alkyl lithium with or without a complexing agent to lithiate the olefin group to give a allyl lithium adduct.

In the alternate preferred embodiment, the alkyl chlorotertiary compound is treated with an alkyl lithium with or without a complexing agent. The alkyl groups therein have normal values but preferably contain about 4 to about 10 carbon atoms in the alkyllithium. In the case of the tertiary chloro alkyl compound, the methyl group is preferred to its homologues of 2 or 3 carbon atoms as is known to those familiar with the inifer process and living polymer process identified at the beginning of this specification.

Olefins other than isobutylene can be used to make the polyolefin segment in the starting materials useful in this invention. For instance, the polymer segment may be a homopolymer of the well known olefins of 2 to 20 carbon atoms and preferably of the isoolefins of 4 to about 10 carbon atoms; also, the diolefins of conjugated and nonconjugated type may be used, preferably to give copolymer portions, or block segments. These diolefins usually have from 4 to about 10 carbon atoms and are represented by butadiene, isoprene, piperylene and hexadienes.

The tertiary chloro alkyl polyolefin compounds of this invention can be represented generally by the formula

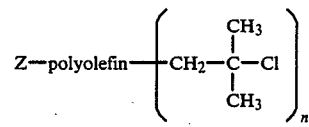

where Z is an organic group such as a tertiary hydrocarbon containing aryl, cycloalkyl or alkyl groups and n has values of 1, 2 and 3.

These starting compounds can be made by the well known inifer process or the living polymer techniques. The chlorine atom can be removed by dehydrochlorination to yield an ethylenically unsaturated derivative or the ethylinically unsaturated derivative can be lithiated with alkyl lithium to yield an allyl lithium derivate.

The products of this invention are useful to make end group cured polymers and novel alcohols, acids and related derivatives.

What is claimed is:

1. A new composition of matter comprising compounds having the formula

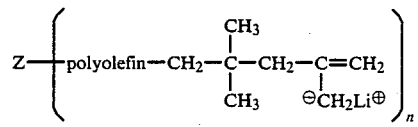

where the polyolefin is a polymer of at least one or more ethylenically unsaturated aliphatic hydrocarbon, Li is a lithium cation, n has values 1, 2, and 3 and Z is an organo groups.

2. The compounds of claim 1 wherein the polyolefin is a polymer of an isoolefin of 4 to 8 carbon atoms.

3. The compound of claim 1 wherein the polymer is polyisobutylene.

4. The compound of claim 1 wherein the polyolefin has a molecular weight of about 500 and higher.

5. The composition of claim 1 where n is 2.

6. The composition of claim 1 where n is 3.

7. The composition of claim 1 where the organic groups is a tertiary alkyl aryl group.

* * * * *